Figure 4:
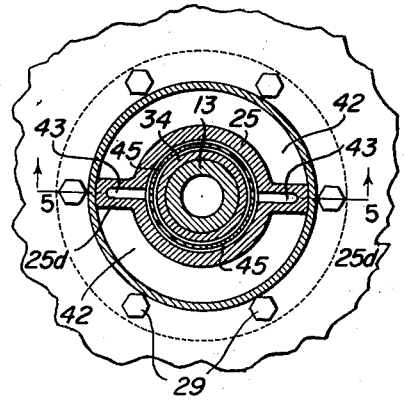

Sept. 17, 1957 — R. A. WILSON — 2,806,364
IMPELLER DRIVE FOR AUTOCLAVES
Filed May 14, 1956 — 2 Sheets-Sheet 1
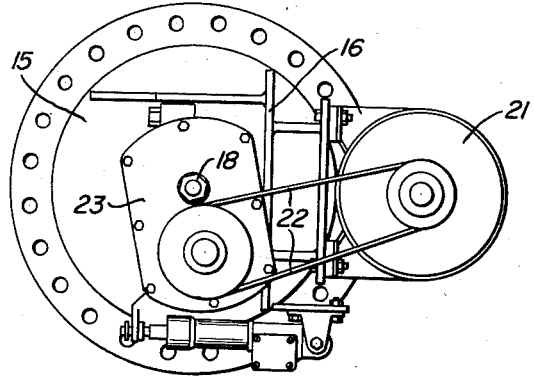
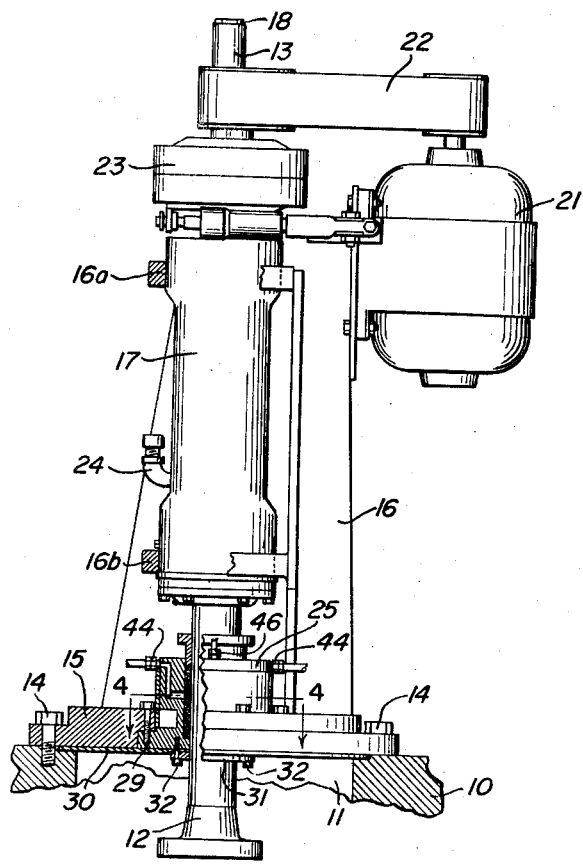
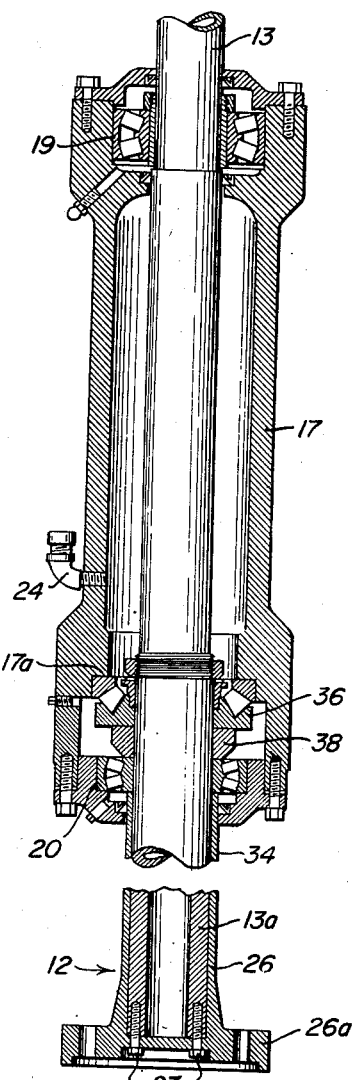
INVENTOR.
ROBERT A. WILSON
ATTORNEYS Sept. 17, 1957 R. A. WILSON 2,806,364
IMPELLER DRIVE FOR AUTOCLAVES
Filed May 14, 1956 2 Sheets-Sheet 2

INVENTOR.
ROBERT A. WILSON
ATTORNEYS

United States Patent Office 2,806,364
Patented Sept. 17, 1957

2,806,364

IMPELLER DRIVE FOR AUTOCLAVES

Robert A. Wilson, Salt Lake City, Utah, assignor to The Galigher Company, Salt Lake City, Utah, a corporation of Utah Application May 14, 1956, Serial No. 584,722

10 Claims. (Cl. 64—1)

This invention relates to drive assemblies for the impellers of autoclaves, particularly high pressure autoclaves intended for use in the processing of corrosive and abrasive materials.

Great difficulty has been experienced with the impeller drives of high pressure autoclaves as ordinarily constructed, especially when the material being processed within the autoclave is of a highly corrosive nature as in instances of recently developed metallurgical practices.

While conventional water-cooled impeller shafts and water-cooled stuffing boxes are entirely satisfactory in dealing with the elevated temperatures involved, much difficulty is experienced by reason of salt precipitation on the shaft surface from the sealing water associated with the lantern ring of the stuffing box and by corrosion of the shaft generally.

Principal objects of the present invention are to eliminate such difficulties and to provide a trouble-free and durable impeller drive capable of maintaining tight sealing of the autoclave at all times during use.

A further object is to accomplish the above along with the use of a more or less conventional water-cooled shaft and water-cooled stuffing box arrangement.

Outstanding features of the invention are the provision of a rigid sleeve about the impeller shaft, in the extension of such shaft from the interior of the autoclave through the stuffing box and into the bearing housing; the making of such sleeve in longitudinal sections, including a section of titanium or similar non-corrosive material extending along autoclave-proximate portions of the shaft to the stuffing box, and a section of stainless steel or similar corrosion-resistant but good heat conductive and low friction material extending through the stuffing box; a gasketed, lap-type joint between mutually abutting ends of such sleeve sections, with the stainless steel lapping over the titanium and restraining its expansion; and thrust-absorbing means against which abuts that end of the sleeve that is remote from the autoclave.

A desirable optional feature is the circulation of wash water through the stuffing box, both as a coolant and as a cleanser for the sleeve surfaces rotating within such stuffing box.

Further objects and features of the invention will become apparent from the following detailed description of the particular preferred embodiment illustrated in the accompanying drawings.

Figure 6:
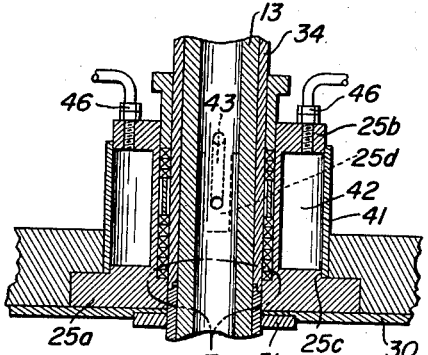
Figure 8:
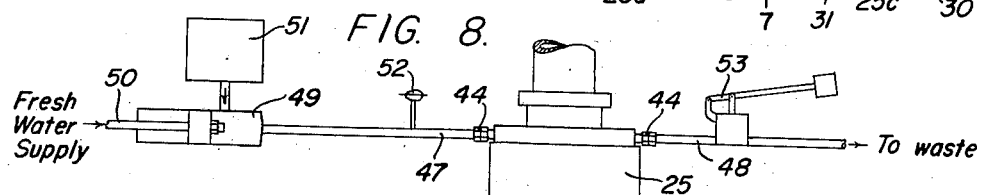
Figure 5:
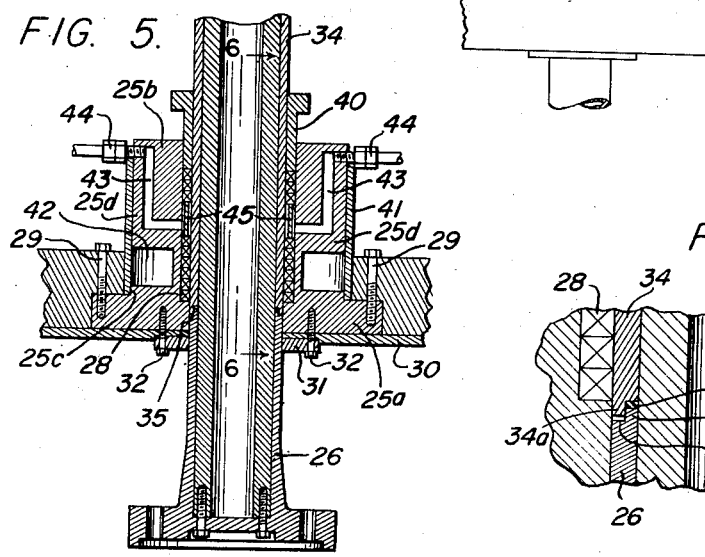
Figure 7:
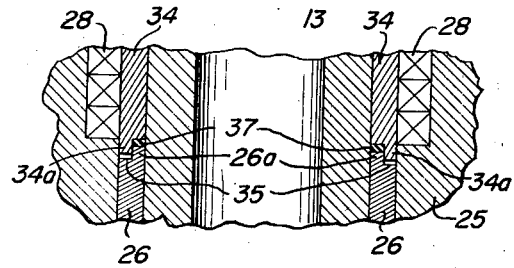

In the drawings:

Fig. 1 represents a side elevation partly in vertical section of the impeller drive as installed on an autoclave, the latter being shown in section and only fragmentarily;

Fig. 2, a top plan view of the impeller drive alone;

Fig. 3, a vertical axial section taken through the bearings and bearing housing of the impeller drive, the view being drawn to a scale considerably enlarged over that of Figs. 1 and 2, the autoclave, stuffing box, and other parts being broken away for convenience of illustration;

Fig. 4, a fragmentary horizontal section taken on the line 4—4 of Fig. 1 and drawn to a considerably enlarged scale;

Fig. 5, a fragmentary vertical section taken on the line 5—5 of Fig. 4;

Fig. 6, a fragmentary vertical section taken on the line 6—6 of Figs. 4 and 5;

Fig. 7, the portion of Fig. 6 encircled by the line 7, drawn to a considerably enlarged scale; and Fig. 8, a diagrammatic layout of the high pressure fluid sealing system for the stuffing box.

Referring to the drawings:

The autoclave 10, Fig. 1, may be of any suitable construction for the treatment of corrosive and abrasive materials, such as metallurgical and chemical pulps, under conditions of high pressure and of relatively high temperature, for example, 900–1000 pounds per square inch and 475°–500° Fahrenheit.

Such an autoclave ordinarily stands vertically, and is provided with an opening 11 at its upper end through which the lower, composite portion 12 of a hollow impeller shaft 13 extends and over which the impeller drive assembly is securely fastened as by means of studs 14 passing through a base plate 15 and into the body of the autoclave.

In many respects, the impeller drive assembly of the invention is conventional. Thus a standard 16 rising from fixed securement in base plate 15 serves to support a bearing housing 17 by means of upper and lower brackets 16a and 16b, respectively. The hollow impeller shaft 13, including its composite lower portion 12, is cooled by the circulation, interiorly thereof, of water supplied in conventional fashion through plug 18. Such shaft extends through upper and lower bearings 19 and 20, respectively, Fig. 3, in housing 17, and is driven by an electric motor 21 through a standard belt drive 22 and speed reducing mechanism 23. Lubricating oil is introduced into the interior of bearing housing 17 through a supply fitting 24.

Under processing conditions ordinarily encountered in the use of autoclaves, the impeller shaft is of simple unitary construction fabricated from conventional materials. However, under the especially difficult conditions imposed by recently developed chemical and metallurgical processes, conventional constructions have proven entirely inadequate. It is to satisfactorily handle such conditions of extremely high pressure and extreme corrosiveness at relatively high temperature that the impeller drive of the present invention was developed.

The difficult conditions mentioned above require that the lower portion of the impeller shaft exposed to the contents of the autoclave by exceptionally corrosion resistant. On the other hand, the necessity of passing the impeller shaft through a stuffing box in order to retain high working pressure in the autoclave, means that the upper portion of such impeller shaft must have a low coefficient of friction and good heat conduction.

In order to meet the above requirements, the composite lower portion 12 of the impeller shaft includes, according to the present invention, not only the lower extension 13a of shaft 13 as a structural core, but an external protective sleeve and end cap as well, the sleeve extending from bearing housing 17 through stuffing box 25 and into the autoclave.

In the form illustrated, the impeller shaft proper 13 is increased somewhat in diameter at intervals along its length, from its upper end downwardly, to facilitate assembly of the mechanism, and is preferably machined from a type of steel ordinarily used for such a purpose.

The protective sleeve is made in two cylindrical sections disposed in end to end overlapping engagement.

The lower section 26 of such protective sleeve is formed with a flanged cap portion 26a at its lower end for rigid securement to the lower end of shaft 13, as by means of screws 27, the flange serving for attachment of the impeller (not shown). It is made of a rigid and non-corrosive material having sufficient structural strength to carry the impeller and to withstand and transmit the pressure imposed upon it from the interior of the autoclave. Most materials of this type, for example titanium, which is presently preferred, have frictional and heat conductive characteristics that render them unsuitable for running against a packing. Accordingly, lower sleeve section 26 extends beyond the interior of the autoclave 10, but short of the packing 28 in stuffing box 25, see especially Fig. 5.

Stuffing box 25 is rigidly secured, as by means of screws 29, within a receiving aperture disposed centrally of base plate 15, and both base plate and stuffing box are protected from the corrosive contents of the autoclave by means of a protective sheet 30, preferably of titanium, held in place by a retaining ring 31 and screws 32, both of these, as well as screws 27, being also preferably of titanium. Stuffing box 25 is preferably of stainless steel.

The upper section 34 of the protective impeller shaft sleeve extends from a gasketed lap-type joinder 35 with lower sleeve section 26, through packing 28, and into thrust-absorbing relationship with a thrust bearing 36 in the lower part of bearing housing 17.

Such upper sleeve section 34 is made of a material that is reasonably resistant to corrosion and has a low coefficient of friction and good heat conduction, for example and preferably, stainless steel. These properties enable it to operate against packing 28, without developing undue heat, as would be true if the titanium lower sleeve section 26 extended through the packing.

The lap-type joinder 35 between the two sleeve sections is important in maintaining the high working pressure required within the autoclave. The upper or stainless steel sleeve section 34 is lapped over the titanium lower sleeve section 26 circumferentially, as shown most clearly in Fig. 7, providing an externally closed seat for a ring gasket 37 of suitable heat-resistant material, for example, a tetra-fluoroethylene resin such as that presently available on the market under the proprietory name "Teflon."

It should be noted that the pressure within the autoclave exerts an upward thrust against the impeller and sleeve cap 26a. Such thrust is transmitted through sleeve sections 26 and 34 to thrust bearing 36, which, in turn, transmits it to bearing housing 17 through the annular shoulder 17a thereof. Brackets 16a and 16b, standard 16, and, finally, plate 15 transmit it back to the housing of autoclave 10, as can be easily seen from Fig. 1. In this connection, it will be noted from Fig. 3 that upper sleeve section 34 abuts directly against lower bearing 20 in housing 17, and that it, in turn, abuts against a spacer ring 38 that bears against thrust bearing 36.

It is a feature of the invention that the thrust is made use of to tightly seal lap joint 35 against any loss of pressure therethrough, the overlapping annular shoulders 26a and 34a of the respective sleeves being dimensioned relative to the ring gasket 37 to impart thrust pressure to the gasket during operation of the autoclave.

In addition, the fact that the stainless steel laps over a material having a greater coefficient of heat expansion, namely, the titanium, means further desirable sealing of the joint as annular shoulder 34a restrains expansion of annular shoulder 26a.

Stuffing box 25 is advantageously cooled by a low pressure fluid circulatory system and both sealed and flushed by a high pressure circulatory system. For these purposes, it is of unique construction, as may be best seen in Figs. 4–6.

It is, of course, of sleeve formation for receiving the impeller shaft, the packing 28, and a packing gland 40 in customary manner. A base flange 25a enables it to be secured to base plate 15 by the screws 29, as afore-explained.

An annular flange 25b at its top is of the same diameter and concentric with a circumferential shoulder 25c that rises from base flange 25a, and, together, they serve to receive a close-fitting sleeve 41, which is welded thereto in a fluid-tight manner. There is thus formed, between the stuffing box body 25 and its encircling sleeve 41 a fluid-tight, annular chamber 42 for the reception of a cooling fluid, such as water.

Depending deeply into chamber 42 from the top 25b thereof are a pair of preferably diametrically opposite, radial walls, designated 25d, respectively, that serve both as directive baffles for the water circulating through the chamber and as means for accommodating fluid-flow passages 43 of the high-pressure fluid sealing system.

The stuffing box body 25 is advantageously cast from stainless steel, and appropriately machined. Sleeve 41 may be a length of ordinary steel pipe. The outer ends of fluid-flow passages 43 are tapped to receive pipe fittings 44 for the fluid supply and discharge lines, respectively. The inner ends open into lantern ring 45.

In the cooling of the stuffing box, a coolant, preferably water from the regular utility supply system, is continuously introduced into chamber 42, at a high level thereof, through one of a pair of pipe fittings 46, Fig. 6, in top flange 25b. Discharge takes place through the other pipe fitting 46. For best circulatory effect, the fittings 46 are disposed diametrically opposite each other and midway between the baffle walls 25d.

A preferred arrangement for the high pressure fluid circulatory system connected to pipe fittings 44 is illustrated in Fig. 8, where the line for supplying sealing and flushing fluid, usually fresh water, to stuffing box 25 is designated 47 and the line for discharging same from such stuffing box is designated 48.

The water is supplied under high pressure, ordinarily somewhat higher than the autoclave pressure, by means of a pump 49, into which a fresh water supply line 50 leads. The pump is equipped with a standard accumulator 51. Interposed in line 47 is a pressure indicator and alarm 52 of standard type, and interposed in discharge line 48 is a pressure regulating valve 53, also of standard type. Discharge line 48 normally leads to a waste drain (not shown).

By such system, it is possible to continuously change the sealing fluid and flush the lantern ring area of the stuffing box free of foreign matter that might damage the rotating impeller shaft.

Whereas this invention is here illustrated and described with respect to a particular preferred embodiment thereof, it is to be understood that various changes may be made therein, within the scope of the claims that here follow, without departing from the essential teachings hereof.

I claim:

1. In an impeller drive for autoclaves, which includes an impeller shaft, supporting and bearing means therefor, a stuffing box containing packing, and drive means, the combination with said impeller shaft of two cylindrical sleeve sections disposed end to end on said shaft, one of said sleeve sections being of non-corrosive material, being provided with a closed end for attachment to an impeller, and being fitted over the impeller-carrying end of the impeller shaft, completely covering said end but terminating short of the stuffing box, and the other of said sleeve sections being of relatively good heat conductive and low frictional material and extending through the stuffing box to thrust-imparting relationship with the supporting and bearing means; and a thrust-transferring joint between adjoining ends of said sleeve sections, for imparting thrust from said one section to said other section.

2. The combination of claim 1, wherein the thrust-transferring joint is of abutment lap-type, with the end of said other sleeve section overlapping the end of said one sleeve section outwardly of the joint; and a fluid-sealing gasket squeezed between said ends of the sleeve sections inwardly of the joint.

3. The combination of claim 2, wherein the said one sleeve section is of titanium and the said other sleeve section is of stainless steel.

4. The combination of claim 1, wherein the said one sleeve section is of titanium and the said other sleeve section is of stainless steel.

5. The combination of claim 1, wherein the packing in said stuffing box includes a lantern ring and chamber; and means are provided for continuously circulating fresh sealing fluid through said lantern ring chamber.

6. The combination of claim 5, wherein means are provided for maintaining the circulating sealing fluid under pressure greater than autoclave pressure.

7. The combination of claim 1, wherein the body of the stuffing box is hollow; and means are provided for circulating a coolant through the hollow interior of said body.

8. The combination of claim 7, wherein the hollow interior of the body of the stuffing box is an annular chamber; and a pair of oppositely disposed, circulation-directive baffles extend transversely across said annular chamber.

9. The combination of claim 8, wherein the packing in said stuffing box includes a lantern ring and chamber; and means are provided for continuously circulating fresh sealing fluid through said lantern ring chamber, said means including fluid-flow passages extending through the circulation-directive baffles, respectively.

10. The combination of claim 9, wherein the said one sleeve section is of titanium and the said other sleeve section is of stainless steel.

References Cited in the file of this patent

UNITED STATES PATENTS 2,627,171     Brumagim  -------------- Feb. 3, 1953